(12) United States Patent
Kato et al.

(10) Patent No.: US 8,371,335 B2
(45) Date of Patent: Feb. 12, 2013

(54) SOLENOID VALVE ASSEMBLY

(75) Inventors: Hisataka Kato, Tsukubamirai (JP);
Shinichi Yoshimura, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 895 days.

(21) Appl. No.: 12/034,133

(22) Filed: Feb. 20, 2008

(65) Prior Publication Data

US 2008/0203339 A1      Aug. 28, 2008

(30) Foreign Application Priority Data

Feb. 26, 2007   (JP) ................................. 2007-046108

(51) Int. Cl.
*F15B 13/043*   (2006.01)
(52) U.S. Cl. ................. 137/625.64; 137/454.2; 137/884
(58) Field of Classification Search ............. 137/625.65, 137/454.2, 625.25, 884, 596.14, 596.16, 137/596.17, 596.18, 625.6, 625.64; 251/129.01, 251/129.15, 367
See application file for complete search history.

(56) References Cited

U.S. PATENT DOCUMENTS

| | | | | |
|---|---|---|---|---|
| 3,215,158 | A | * | 11/1965 | Bass, Jr. et al. ................ 137/269 |
| 4,966,195 | A | * | 10/1990 | McCabe ................... 137/625.61 |
| 5,758,931 | A | * | 6/1998 | Hio et al. .................... 303/119.2 |
| 6,612,332 | B2 | * | 9/2003 | Miyazoe et al. ............... 137/552 |
| 6,932,320 | B2 | * | 8/2005 | Fukano et al. ........... 251/129.15 |
| 2003/0029509 | A1 | * | 2/2003 | Sato et al. ................ 137/625.65 |
| 2004/0051069 | A1 | * | 3/2004 | Miyazoe .................. 251/129.15 |

FOREIGN PATENT DOCUMENTS

JP           8-4933         1/1996

* cited by examiner

*Primary Examiner* — Craig Schneider
*Assistant Examiner* — Kevin Murphy
(74) *Attorney, Agent, or Firm* — Oblon, Spivak, McClelland, Maier & Neustadt, L.L.P.

(57) ABSTRACT

A solenoid valve assembly includes a three-port solenoid valve and a solenoid-valve holder having the solenoid valve mounted thereon, so that the solenoid valve can be attached on a pneumatic instrument via the solenoid-valve holder. When the solenoid valve is mounted on the solenoid-valve holder, this solenoid-valve holder is provided with a plurality of flow paths that communicate with each port of the solenoid valve, connection terminals electrically and respectively connected to electrification terminals conducting with an exciting coil of the solenoid valve, and receiving terminals for connecting the connection terminals to terminals of external power, respectively.

12 Claims, 11 Drawing Sheets

SOLENOID VALVE ASSEMBLY

TECHNICAL FIELD

The present invention relates to a three-port solenoid valve assembly used for driving various pneumatic instruments as well as for driving a main directional control valve as a pilot solenoid valve.

A pilot solenoid valve for driving a three- or five-port main directional control valve with a three-port pilot valve has been known as disclosed in Japanese Unexamined Patent Application Publication No. 08-4933. In such a pilot solenoid valve, there are different various specifications in accordance with the capacity, pattern, and piping system of the main directional control valve. Also, in an electrification system for turning electricity on the pilot valve, various patterns of contact terminals are used.

Hence, in order to reduce cost, the pilot valve is standardized in common or in a plurality of limited kinds different in capacity, except for the electrification system, so that mass production may be enabled and the electrification system may be connected to each pilot valve. Simultaneously, it is effective that each pilot valve is simply connected to the main directional control valves with various specifications, or each pilot valve is operatively connected to various kinds of pneumatic instruments as a three-port solenoid valve. However, since this is for reducing the cost, it is necessary that the electrification system is connected to the pilot valve (three-port solenoid valve) and the pilot valve is fixed to the main directional control valve by a simple and inexpensive means.

DISCLOSURE OF INVENTION

It is a technical object of the present invention to provide a three-port connection solenoid valve assembly having simple and inexpensive configurations and capable of simply operating various pneumatic instruments as well as being capable of driving main directional control valves with various specifications as a three-port solenoid valve.

In order to solve the problems described above, a solenoid valve assembly according to the present invention includes a solenoid valve that includes a valve body having a supply port, an output port, a discharge port, and a valve chamber communicating with these ports; a valve member arranged in the valve chamber for switching the communication between the supply port, the output port, and the discharge port; and an electromagnetic operation unit fixed to the valve body for driving the valve member; and a solenoid-valve holder for mounting the solenoid valve on a pneumatic instrument driven by the solenoid valve.

The solenoid-valve holder includes a fixing plate, having a first fixing face for attaching the solenoid valve thereon and a second fixing face for attaching the pneumatic instrument thereon; a terminal block formed integrally with the fixing plate to extend perpendicularly to the fixing plate; and an electrification system for turning electricity on an exciting coil of the solenoid valve, and when the solenoid valve is mounted on the fixing plate, the fixing plate is provided with a supply flow path, an output flow path, and a discharge flow path that are respectively communicating with the respective ports; and a pair of connection terminals electrically and respectively connected to a pair of electrification terminals conducting with the exciting coil; and the terminal block is provided with a pair of receiving terminals arranged to protrude outside the terminal block for connecting the connection terminals to terminals of external power, respectively.

According to the present invention, the fixing plate of the solenoid-valve holder may be linked to the terminal block to form an L-shape, and mount sides and the top face of the solenoid valve may be completely covered with the fixing plate and the terminal block.

In the solenoid valve assembly according to a preferred embodiment of the present invention, the fixing plate of the solenoid-valve holder is provided with a concave accommodating space opened toward the second fixing face, and the solenoid valve assembly further includes a printed circuit board arranged within the accommodating space, the printed circuit board having a control circuit, to which the connection terminals and the receiving terminals are connected.

In the solenoid valve assembly according to another preferred embodiment of the present invention, the solenoid valve is provided with two protruding cylinders formed to have the electrification terminals built therein, whereas the solenoid-valve holder is provided with two recesses formed to be respectively fitted by the protruding cylinders, the recess having the connection terminal arranged therein, so that when the solenoid valve is attached on the solenoid-valve holder, while the protruding cylinders are being fitted into the recesses, respectively, the connection terminals are electrically connected to the electrification terminals, respectively.

According to the present invention, preferably, the exciting coil of the solenoid valve is covered with a magnetic substance cover forming a magnetic path, and the solenoid-valve holder is provided with a grounding terminal for grounding and an earth plate conducting with the grounding terminal, so that the earth plate is brought into contact with the magnetic substance cover by attaching the solenoid valve on the solenoid-valve holder.

According to the present invention, preferably, the valve body of the solenoid valve and the fixing plate of the solenoid-valve holder are provided with a plurality of fixing holes passing therethrough, and the solenoid valve and the solenoid-valve holder can be fixed to the pneumatic instrument with fixing screws inserted into the fixing holes.

Since the solenoid valve assembly according to the present invention has the configurations described above, a three-port solenoid valve can be used not only for main directional control valves with various specifications as a pilot valve but also for simply operating various pneumatic instruments.

BEST MODE FOR CARRYING OUT THE INVENTION

Figure 13:
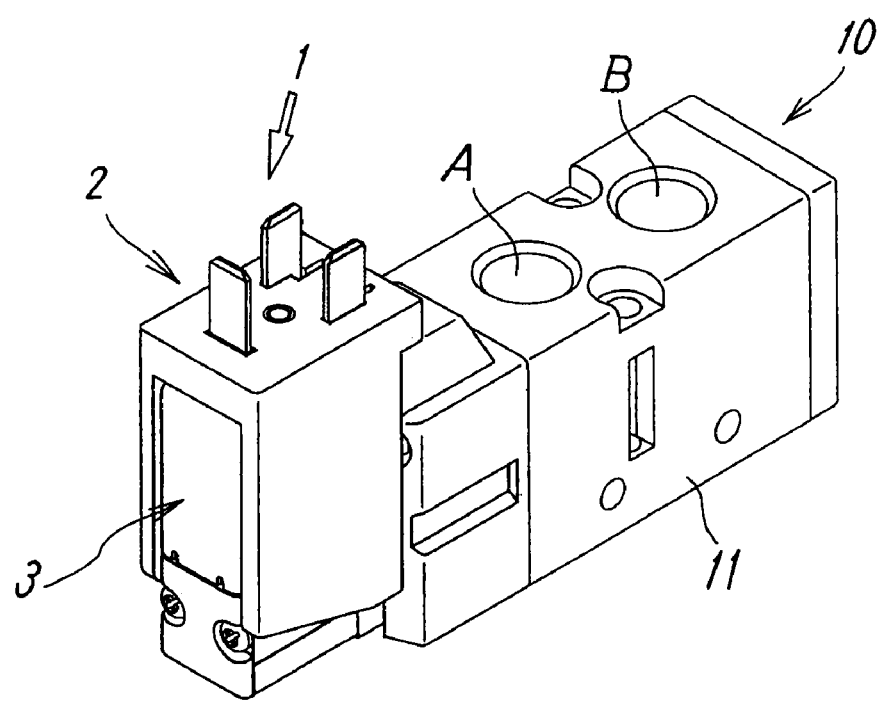
FIG. 13 is a perspective view of a pilot solenoid valve configured by mounting the solenoid valve assembly according to the present invention on a main directional control valve.

The drawings show an embodiment of a solenoid valve assembly according to the present invention. The solenoid valve assembly 1 is composed of a solenoid-valve holder 2 and a solenoid valve 3 mounted on the solenoid-valve holder 2. As shown in FIG. 13, by mounting the solenoid valve assembly 1 on a three- or five-port main directional control valve 10, which is a kind of pneumatic instrument, the solenoid valve 3 is used for the main directional control valve 10 as a pilot valve. However, the solenoid valve 3 is not limited to the used for the pilot valve, so that it may be applied for operating the pneumatic instruments by mounting the solenoid valve assembly 1 on various pneumatic instruments other than the main directional control valve 10.

The main directional control valve 10 is known and has a supply port of the mainstream, output ports A and B, and a discharge port. Using the solenoid valve 3 as a pilot valve, the pilot output is applied to an end of a main valve member (not shown) for switching the flow path in a valve body 11 of the main directional control valve 10, so that by driving the main valve member, the mainstream from the supply port is switched to the output port A or B, and the fluid in the output port B or A is discharged through the discharge port.

Figure 1:
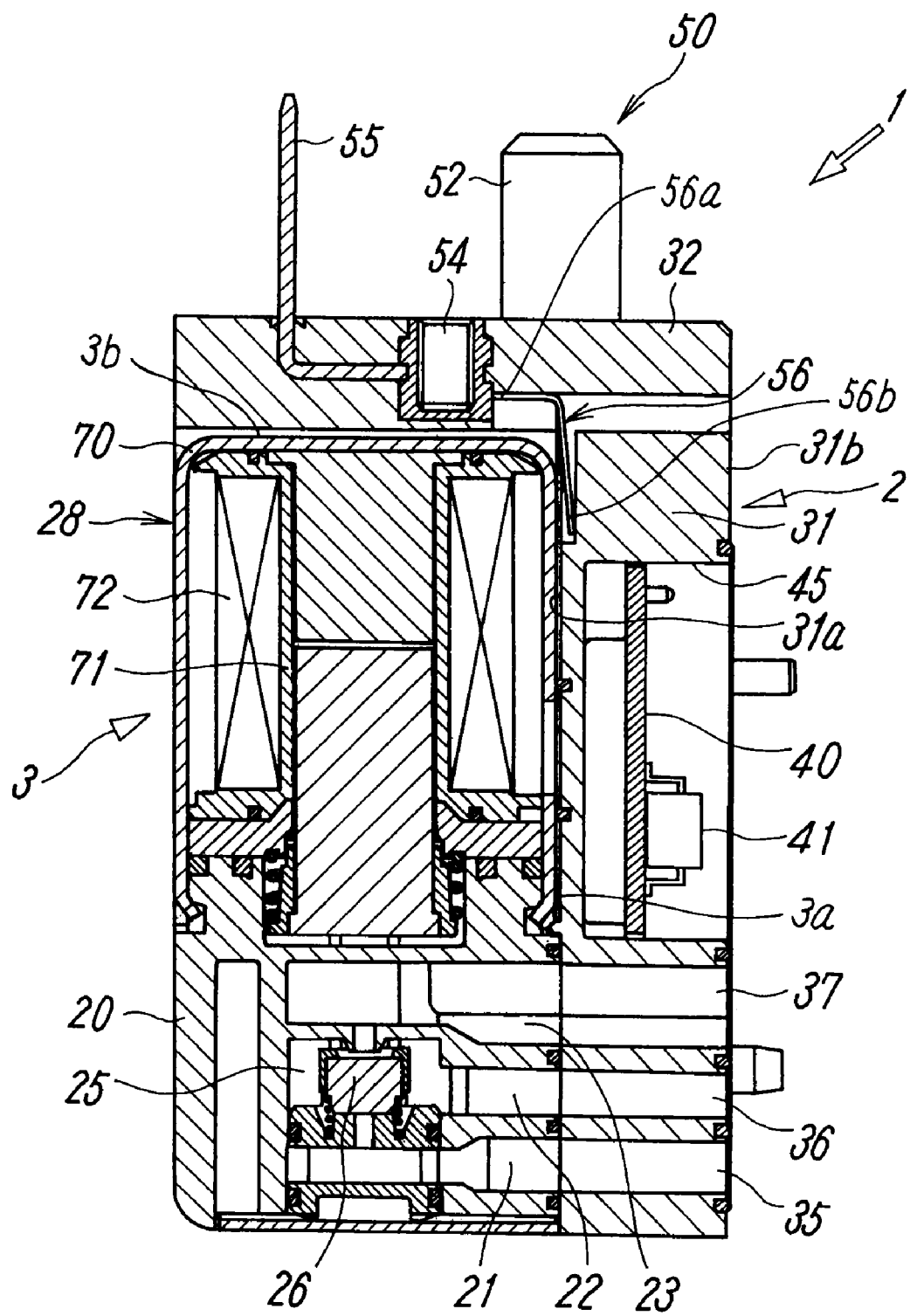
FIG. 1 is a sectional view of a solenoid valve assembly according to an embodiment, showing a section at the line I-I of FIG. 5.
Figure 2:
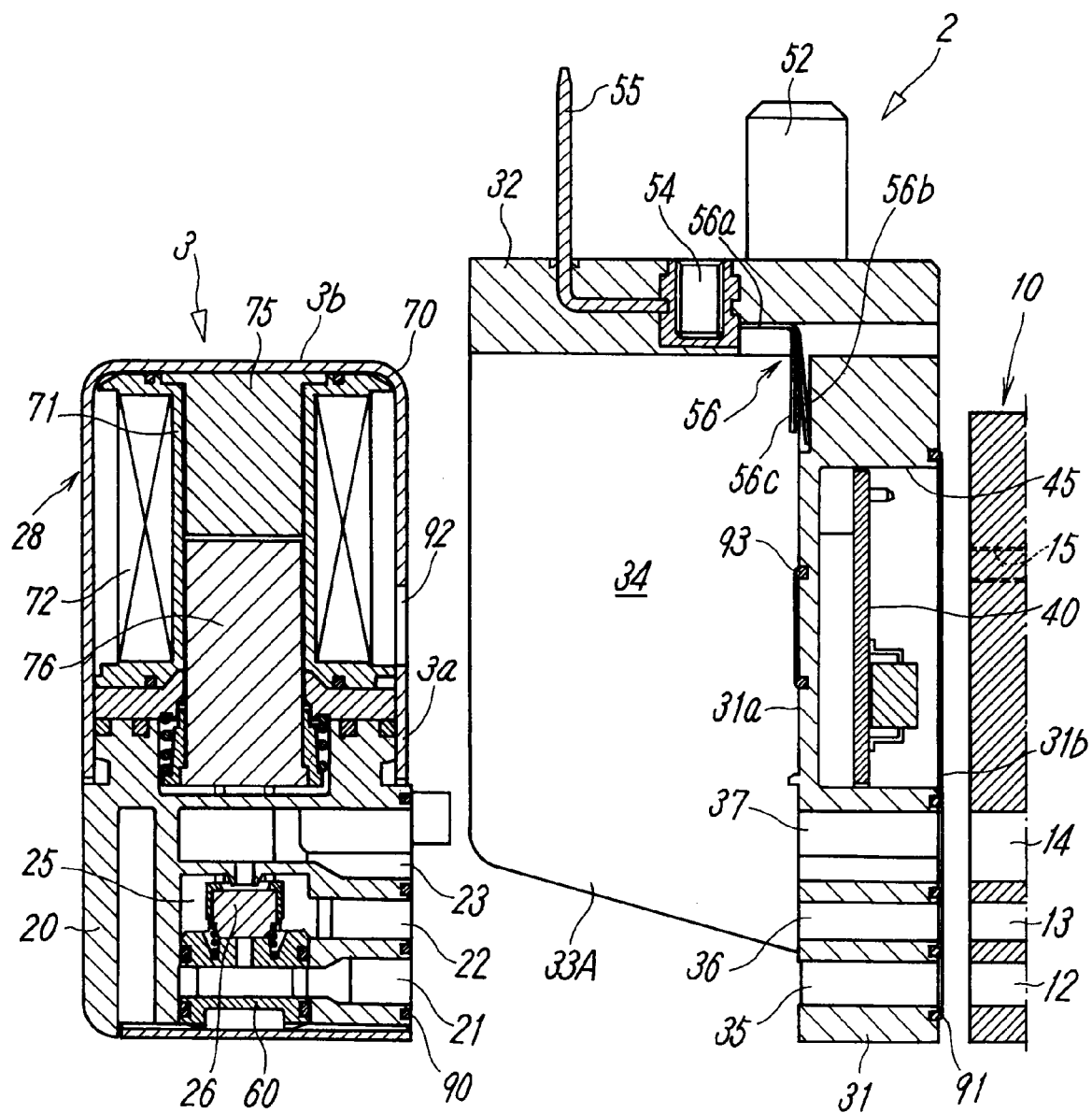
FIG. 2 is a sectional view of the solenoid valve assembly, showing a state that a solenoid valve is separated from a solenoid-valve holder in FIG. 1.

In FIGS. 1 and 2, the solenoid valve 3 constituting the solenoid valve assembly 1 is generally provided with a valve body 20, a supply port 21, an output port 22, a discharge port 23, and a valve chamber 25 for communicating with the respective ports; a valve member 26 is arranged within the valve chamber 25 for switching the communication between the supply port 21, the output port 22, and the discharge port 23; and an electromagnetic operation unit 28 is fixed to the valve body 20 for driving the valve member 26. Among four sides of the solenoid valve 3, one side, a mount side 3a is to be mounted by the solenoid-valve holder 2, and on the mount side 3a, the ports 21, 22, and 23 are opened and an electrification terminal 80 (below mentioned) is arranged.

On the other hand, the solenoid-valve holder 2 generally includes a fixing plate 31 for attaching the solenoid valve 3 thereon and a terminal block 32 formed integrally with the fixing plate 31; the fixing plate 31 and the terminal block 32 are provided with an electrification system for turning electricity on the electromagnetic operation unit 28 of the solenoid valve 3; and on the fixing plate 31, a supply flow path 35, an output flow path 36, and a discharge flow path 37 are opened at positions respectively corresponding to the ports 21 to 23 of the solenoid valve 3, for communicating with these ports.

As shown in FIG. 2, the supply port 21 of the solenoid valve 3 is connected to a supply opening 12, which is communicating with the supply port of the mainstream in the main directional control valve 10, via the supply flow path 35 of the solenoid-valve holder 2; the output port 22 of the solenoid valve 3 is connected to a pilot fluid inlet 13 of the main directional control valve 10 via the output flow path 36 of the solenoid-valve holder 2; and the discharge port 23 of the solenoid valve 3 is connected to a discharge outlet 14, which is communicating with the discharge port through the discharge flow path 37 of the solenoid-valve holder 2, via the pilot fluid inlet 13 of the main directional control valve 10 for discharging the fluid, which has been applied to the end of the main valve member.

Figure 7:
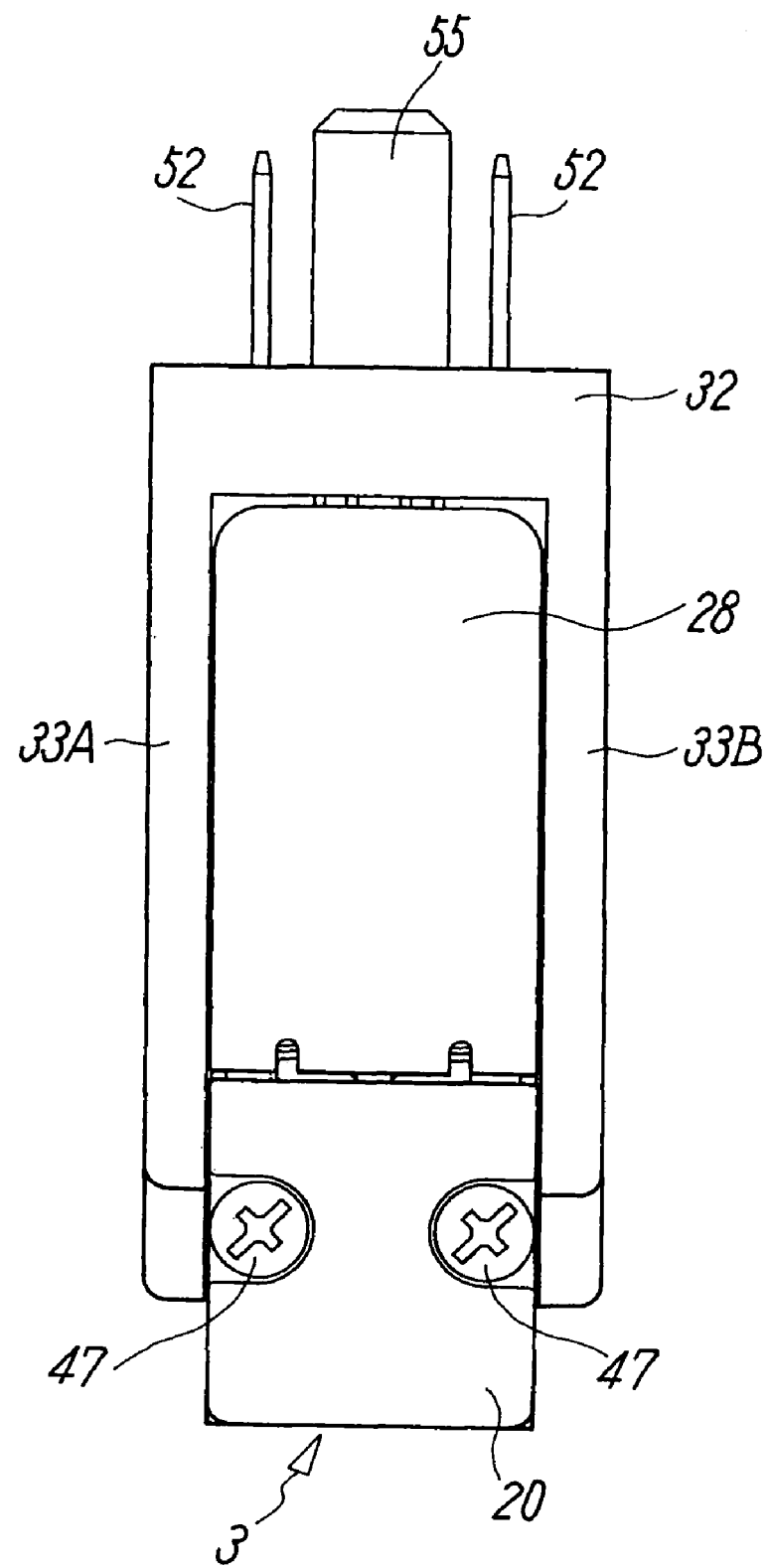
FIG. 7 is a left side view of FIG. 1.
Figure 8:
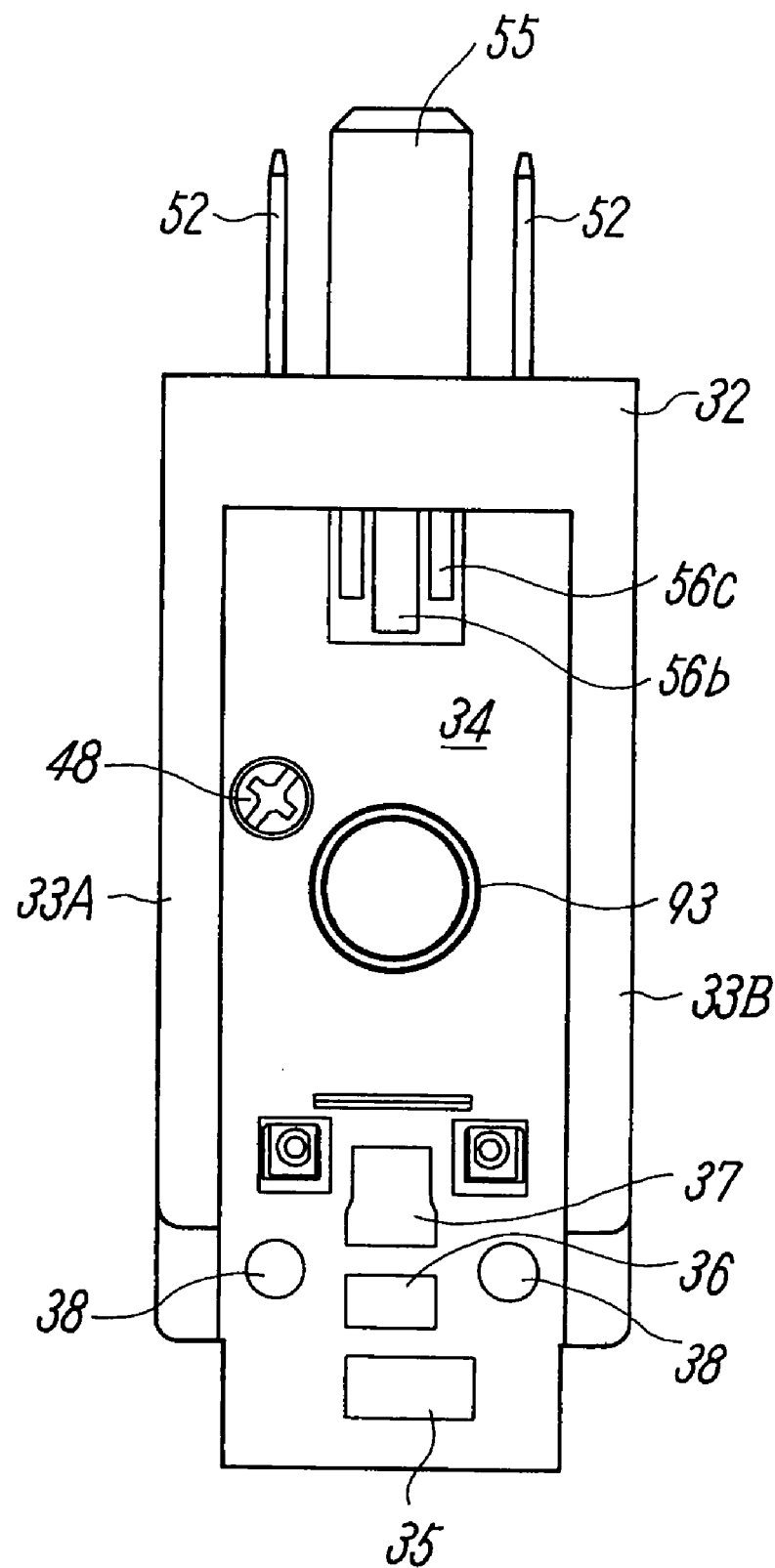
FIG. 8 is a left side view of the solenoid-valve holder shown in FIG. 2.

The configurations of the solenoid valve assembly 1 will be described more specifically. The solenoid-valve holder 2, having a roughly rectangular parallelepiped outer shape, includes the fixing plate 31 including an inside face regarded as a first fixing face 31a for attaching the solenoid valve 3 thereon and an opposite outside face regarded as a second fixing face 31b for attaching a pneumatic instrument thereon, which is driven by the solenoid valve 3, the terminal block 32 formed integrally with the fixing plate 31 to extend perpendicularly to the fixing plate 31, i.e., toward the first fixing face 31a, and side covers 33A and 33B (see FIGS. 7 and 8) for covering both sides of the solenoid valve 3 fixed on the first fixing face 31a, and these components are integrally formed with a synthetic resin. However, the side covers 33A and 33B may be provided if necessary, so that these are not always essential. According to the embodiment as shown in the drawings, the solenoid-valve holder 2 is constructed in a housing shape of the fixing plate 31, the terminal block 32, and the pair of side covers 33A and 33B to form an accommodating space 34 inside for accommodating the solenoid valve 3. Also, the fixing plate 31 is linked to the terminal block 32 to form an L-shape, so that the mount side 3a and the top face 3b of the solenoid valve 3 are perfectly covered with the fixing plate 31 and the terminal block 32.

On the other hand, the fixing plate 31 of the solenoid-valve holder 2 is provided with a recess-like accommodation space 45 formed adjacent to the second fixing face 31b for attaching a printed circuit board 40. Within the accommodation space 45, the printed circuit board 40 having a control circuit 41 is accommodated for controlling the electrification to the solenoid valve 3. As is apparent from FIGS. 3, 4, 10, and 11, the fixing plate 31 is provided with a pair of plug-in connection terminals 42. By mounting the solenoid valve 3 on the first fixing face 31a, while the ports 21 to 23 are communicated with the flow paths 35 to 37, respectively, the connection terminals 42 are connected to a pair of the electrification terminals 80, respectively, which are constituting part of an electrification system for turning electricity on an exciting coil 72 of the solenoid valve 3. The connection terminals 42 are fixed to the printed circuit board 40 to protrude toward the solenoid valve 3.

The valve body 20 of the solenoid valve 3 and the fixing plate 31 of the solenoid-valve holder 2 are respectively provided with a plurality of fixing holes 27 passing through the valve body 20 and a plurality of fixing holes 38 passing through the fixing plate 31 at positions mutually corresponding to each other. With fixing screws 47 inserted into the fixing holes 27 and 38, the solenoid valve assembly 1, i.e., the solenoid valve 3 and the solenoid-valve holder 2, can be fixed to the pneumatic instrument driven by the main directional control valve 10 using the solenoid valve 3 as a pilot valve or the solenoid valve 3.

Figure 3:
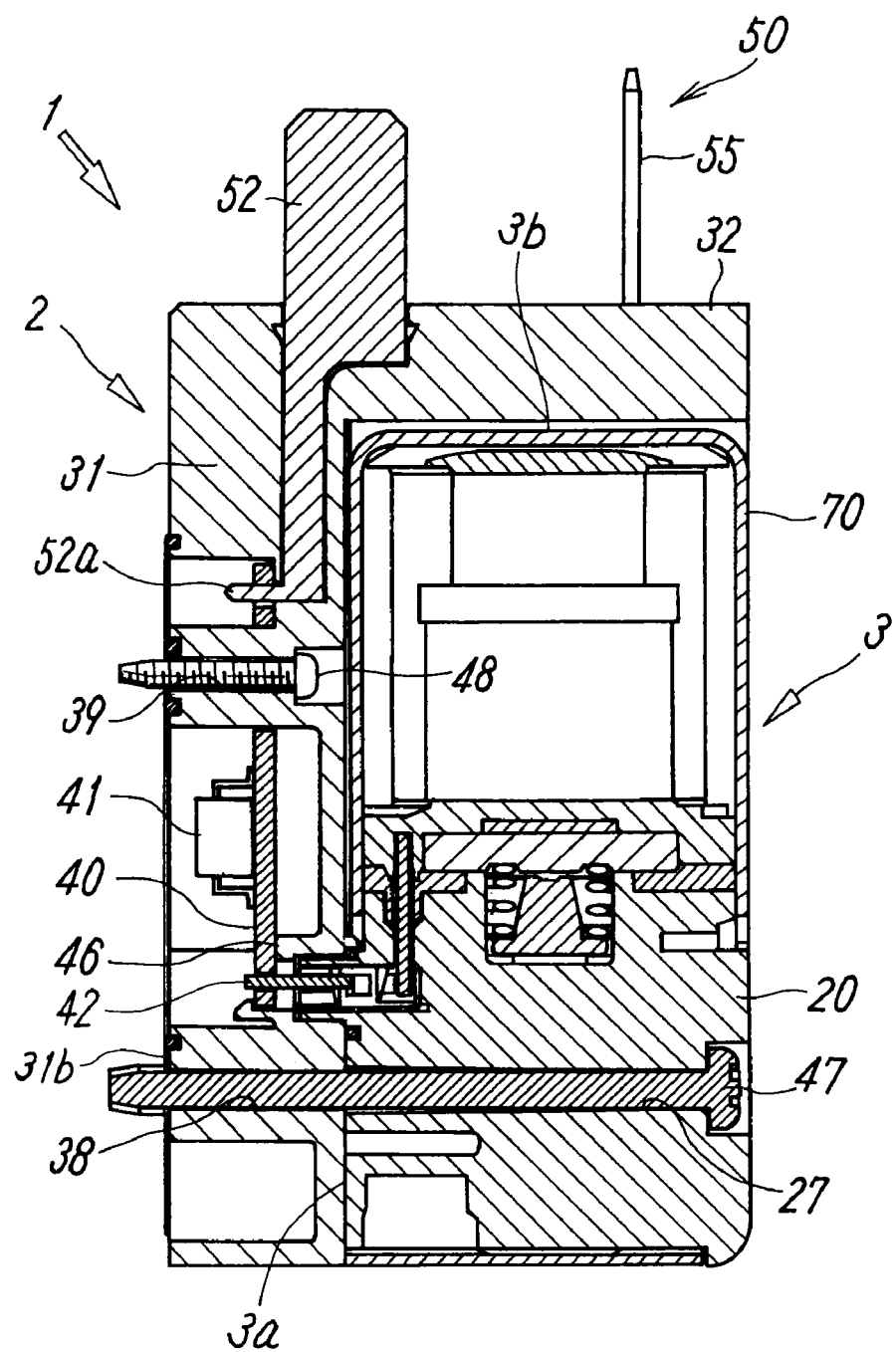
FIG. 3 is a sectional view of the solenoid valve assembly according to the embodiment of the present invention, showing a section at the line III-III of FIG. 6.
Figure 12:
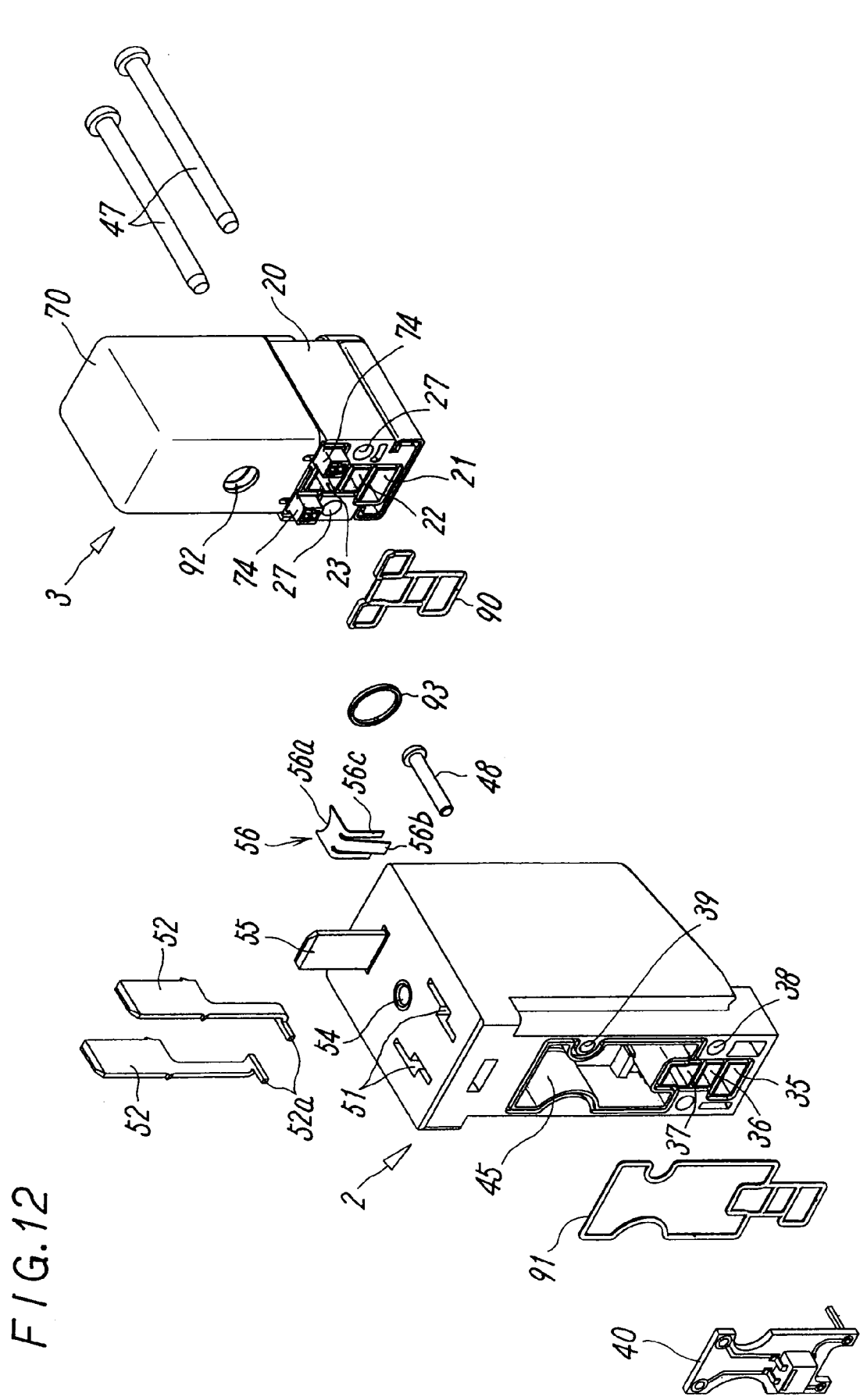
FIG. 12 is an exploded perspective view of the solenoid valve assembly according to the present invention.

Furthermore, as shown in FIGS. 3 and 12, the fixing plate 31 of the solenoid-valve holder 2 is provided with a fixing hole 39 formed to pass through the upper portion of the fixing plate 31, so that by screwing a fixing screw 48 with a tapped hole 15 (see FIG. 2) in the main directional control valve 10 via the fixing hole 39, the solenoid-valve holder 2 can be fixed to the main directional control valve 10. If the tapped hole 15 is provided in another pneumatic instrument, the solenoid-valve holder 2 can be attached to the pneumatic instrument.

In order to attach the solenoid valve 3 and the solenoid-valve holder 2 to the main directional control valves 10 with various specifications and other various pneumatic instruments, the fixing face of the main directional control valve 10 and so forth to be attached by the solenoid-valve holder 2 must be provided with flow paths respectively corresponding to the respective flow paths 35 to 37 on the fixing second face 31*b* as well as tapped holes respectively corresponding to the fixing holes 38 and 39 to be respectively inserted by the fixing screws 47 and 48 so as to fit connections to the second fixing face 31*b*.

On the other hand, the terminal block 32 formed integrally with the fixing plate 31 of the solenoid-valve holder 2 is provided with a DIN-type terminal 50 protruding outside for connecting the connection terminals 42 to terminals of external power. The terminal 50 is composed of a pair of receiving terminals 52 and one grounding terminal 55. As clearly shown in FIGS. 4, 5, and 12, the receiving terminals 52 are inserted into a pair of terminal fixing holes 51 formed in the terminal block 32 of the solenoid-valve holder 2, respectively, and internal end terminals 52*a* of the receiving terminals 52 protrude within the bottom of the accommodation space 45 for the printed circuit board 40. By arranging the printed circuit board 40 in the accommodation space 45, the internal end terminals 52*a* of the receiving terminals 52 are fitted into input connection holes 40*a* of the printed circuit board 40, respectively, so as to be electrically connected to the control circuit 41 on the printed circuit board 40.

Also, as shown in FIGS. 1 and 2, in the terminal block 32, an insert nut 54 made of an electrical conducting material and the grounding terminal 55 are embedded in an electrically connected state by the insert forming. The insert nut 54 is located at the center of the terminal block 32. To the insert nut 54, an end portion 56*a* of an earth plate 56 made of an electrical conducting material is connected. The earth plate 56 is arranged within a recess at the top end of the first fixing face 31*a* in the fixing plate 31 of the solenoid valve 3. By the elastic force of an elastic piece 56*b* protruding in a direction opposite to the end portion 56*a*, the end portion 56*a* is pushed onto the insert nut 54, and the earth plate 56 also has a contact piece 56*c* elastically protruding toward the solenoid valve 3 substantially in parallel with the elastic piece 56*b* (see FIGS. 2 and 12). Hence, when the solenoid valve 3 is mounted on the fixing plate 31, the earth plate 56 is arranged so that the contact piece 56*c* is in contact with the surface of a magnetic cover 70 (below mentioned).

In addition, the terminal 50 is to be connected to the external power via a DIN-type socket (not shown).

The printed circuit board 40 is located at a position between the connection terminals 42 connected to the electrification terminal 80 for turning electricity on the exciting coil 72 of the solenoid valve 3 and the terminal 50 on the terminal block 32. The input side of the control circuit 41 on the printed circuit board 40 is electrically connected to the internal end terminals 52*a* of the above-mentioned receiving terminals 52 while the output side is connected to the electrification terminal 80 of the solenoid valve 3 via the connection terminals 42. A surge protection circuit and an energy saving circuit are incorporated in the control circuit 41.

Although the accommodation space 45 is opened outside so that the printed circuit board 40 and the control circuit 41 are exposed in the drawings, the accommodation space 45 may be covered with a lid.

Figure 4:
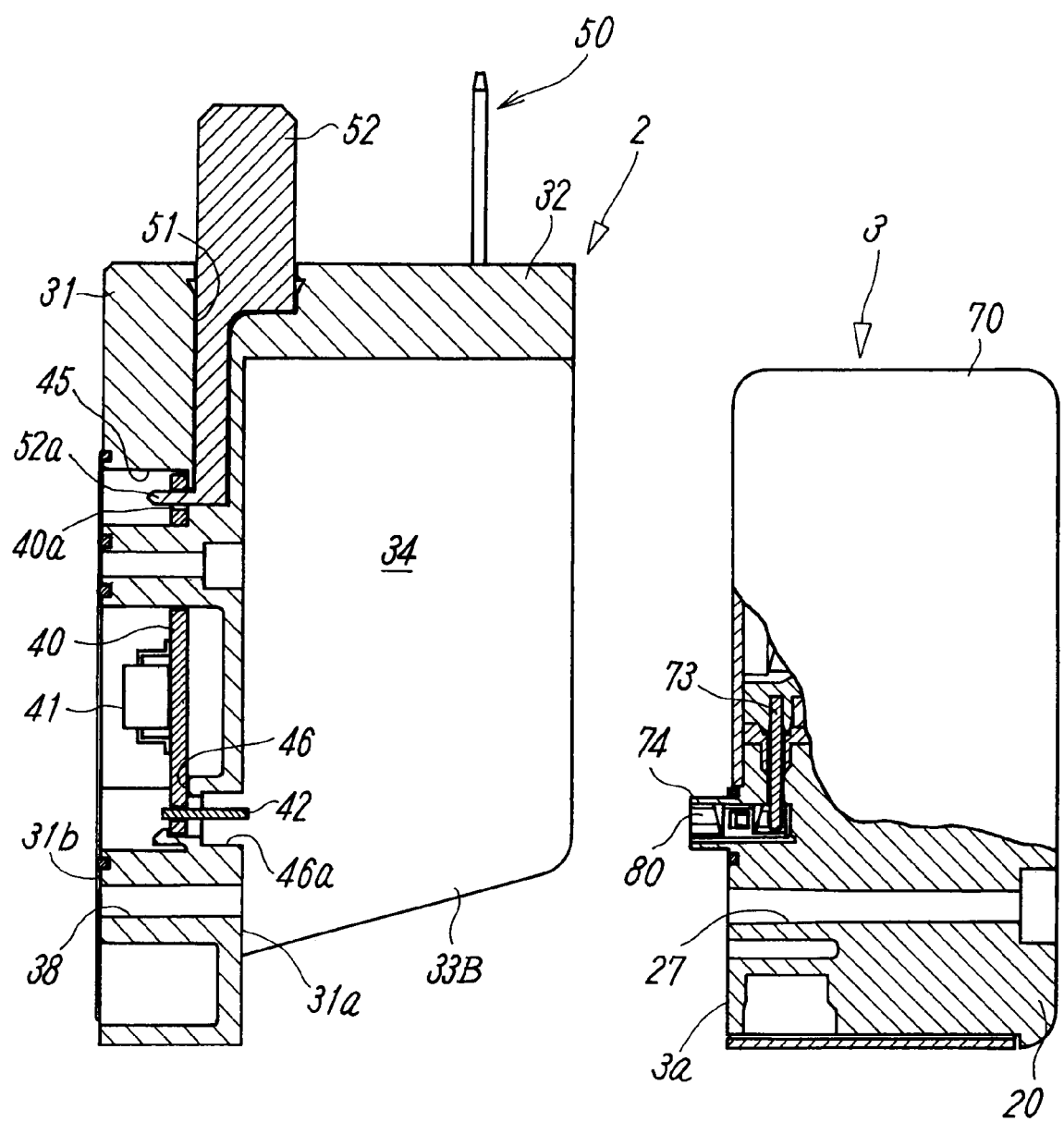
FIG. 4 is a partial sectional view of the solenoid valve assembly, showing a state that the solenoid valve is separated from the solenoid-valve holder in FIG. 3.
Figure 5:
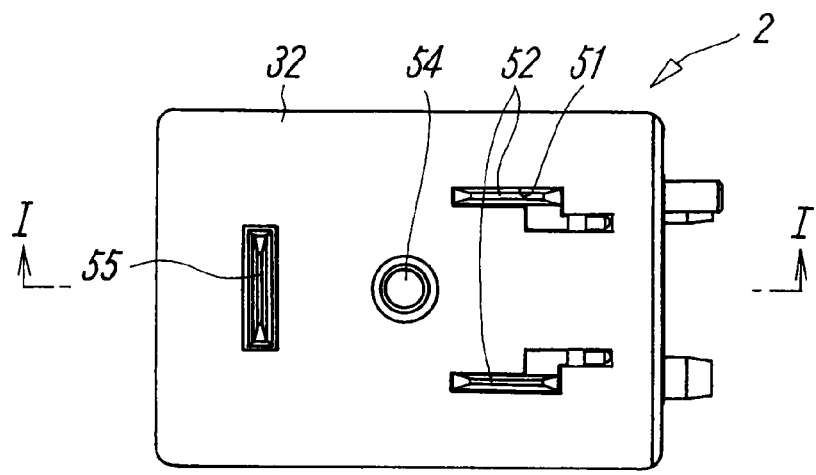
FIG. 5 is a plan view of FIG. 1.
Figure 6:
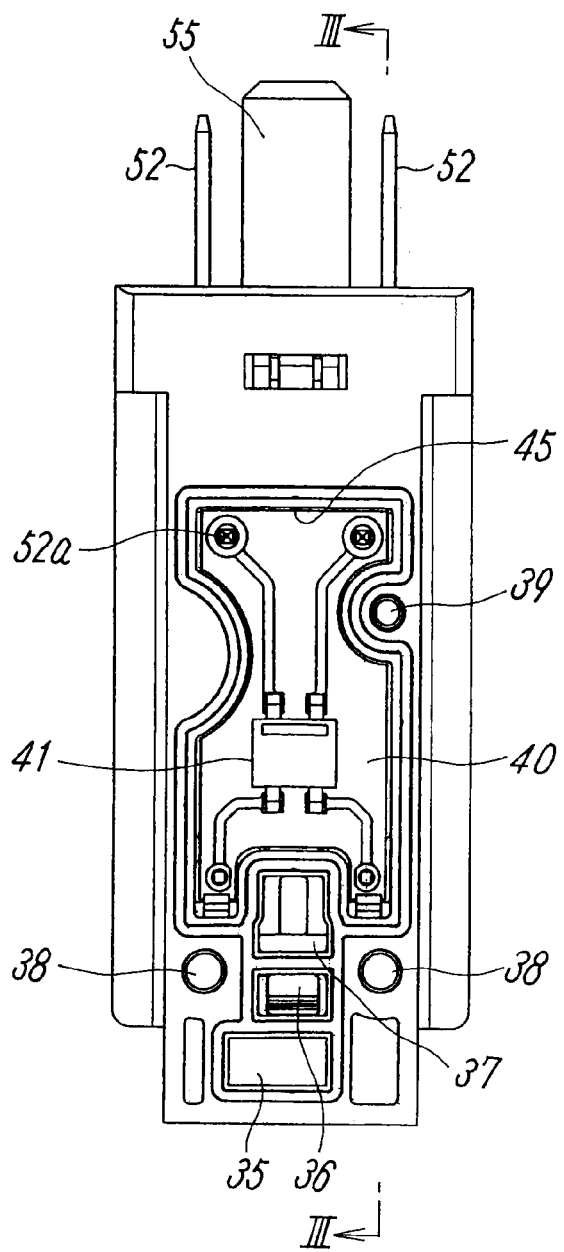
FIG. 6 is a right side view of FIG. 1.
Figure 10:
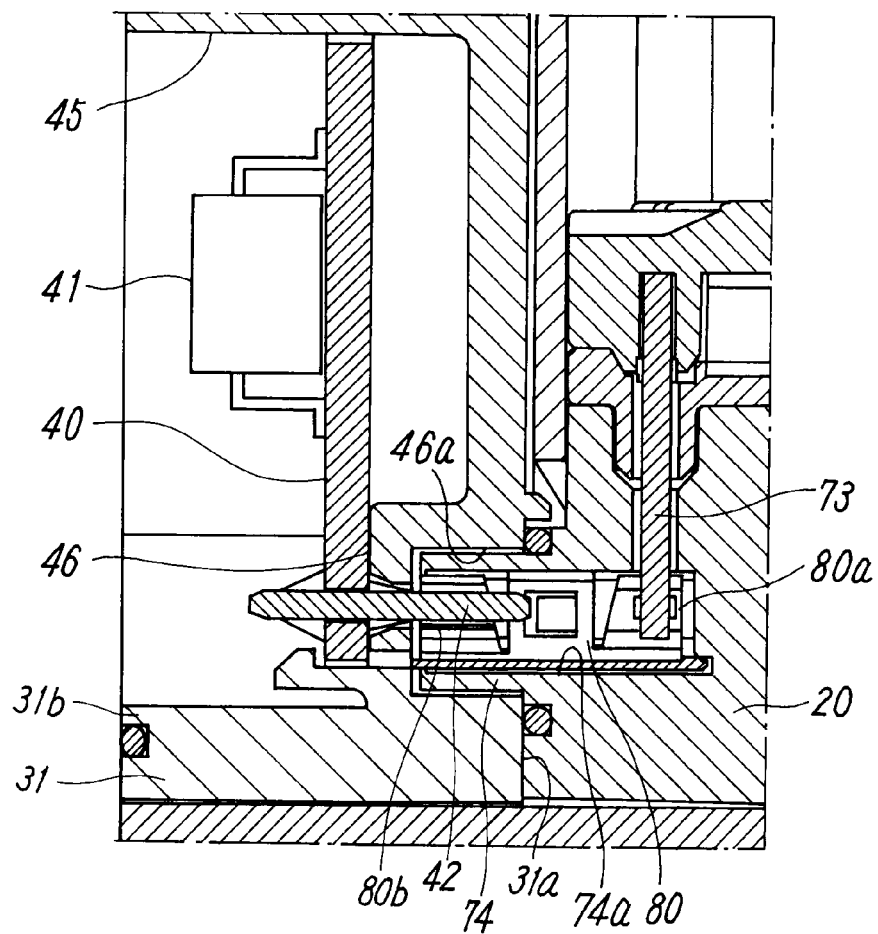
FIG. 10 is a partial enlarged sectional view of FIG. 3.

At the lower end of the accommodation space 45 for accommodating the printed circuit board 40, as shown in FIGS. 3, 4, and 10, a pair of support steps 46 on either side are formed to abut the printed circuit board 40. Inside the support steps 46, recesses 46*a* opened toward the first fixing face 31*a* are respectively formed to have a rectangular cross-section. The pair of the connection terminals 42 provided in the printed circuit board 40 protrude inside the recesses 46*a* via the support steps 46, respectively.

On the other hand, the valve body 20 of the solenoid valve 3 is provided with a pair of rectangular protruding cylinders 74 formed to protrude toward the mount side 3*a* for inserting them into the recesses 46*a* when the solenoid valve 3 is mounted on the first fixing face 31*a*. Inside the protruding cylinders 74, the electrification terminals 80 connected to the exciting coils 72 are arranged, respectively, so that when the protruding cylinders 74 are fitted into the recesses 46*a*, respectively, a pinching part 80*b* at the end of the electrification terminal 80 is electrically connected to the connection terminal 42 of the printed circuit board 40.

Figure 9:
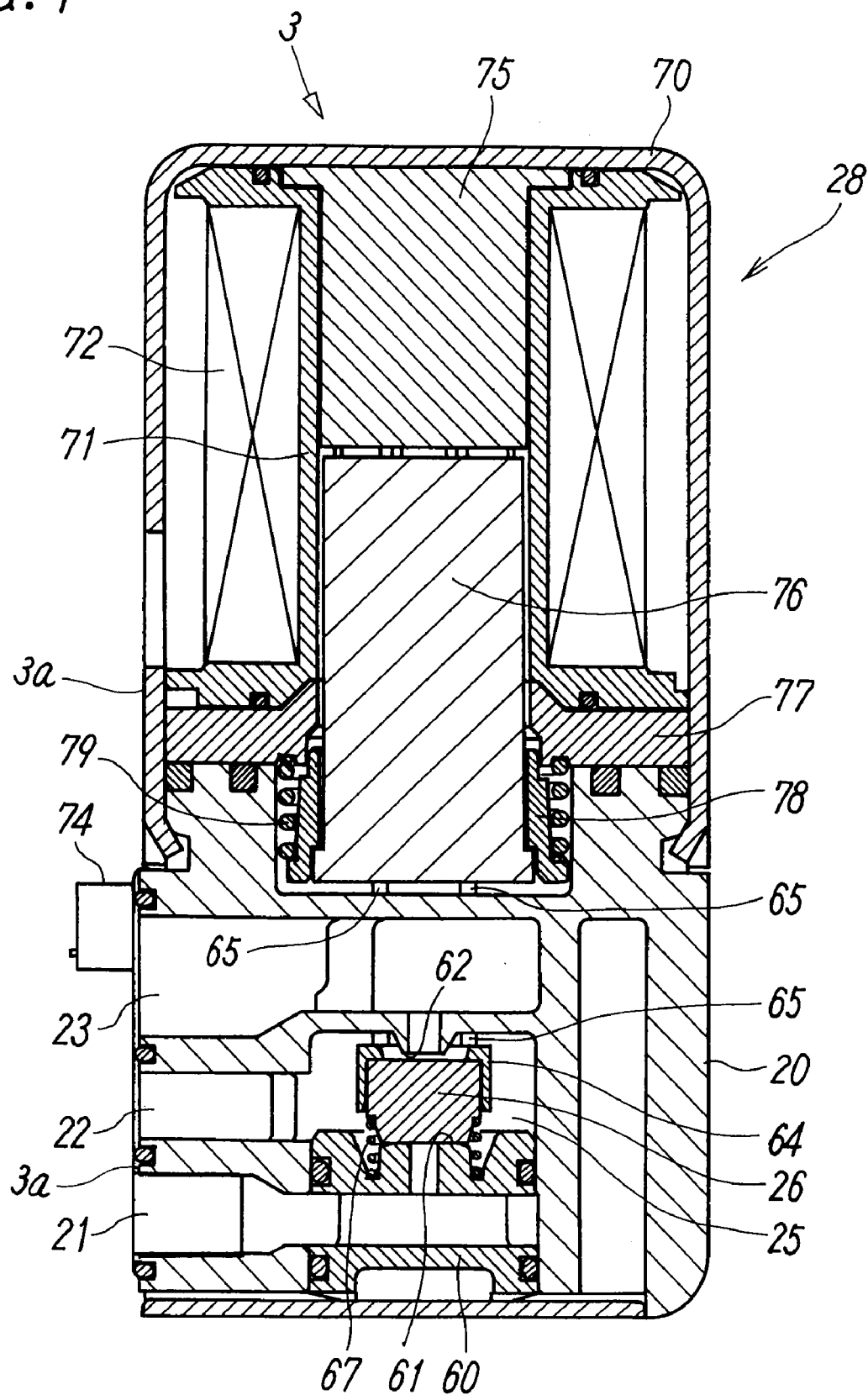
FIG. 9 is an enlarged sectional view of the solenoid valve.

The configurations of the solenoid valve 3 will be described in more detail. The solenoid valve 3, as clearly shown in FIG. 9, includes the valve body 20 made of a synthetic resin and having the supply port 21, the output port 22, the discharge port 23, and the valve chamber 25. In the valve chamber 25, while the ports 22 to 23 are being opened, the poppet-type valve member 26 is reciprocally arranged for switching the communication between the supply port 21, the output port 22, and the discharge port 23. The valve chamber 25 is formed by closing a valve chamber hole opened on the bottom of the valve body 20 with a valve seat block 60.

The supply port 21, which is opened on the mount side 3*a* of the valve body 20, is opened to the valve chamber 25 at the center of the valve seat block 60 via the flow path within the valve seat block 60. A supply valve seat 61 is provided around its opening. The discharge port 23 is also opened to the valve chamber 25 at a position opposing the opening of the supply port 21 via the flow path within the valve seat block 60, and around its opening, a discharge valve seat 62 is provided. Between the valve seats 61 and 62 opposing each other, the valve member 26 is arranged, and the output port 22 is opened to the valve chamber 25 on the side of the valve member 26.

On the valve body 20, the electromagnetic operation unit 28 is fixed for driving the valve member 26. The valve member 26 is supported by a valve holder 64, which is provided with a plurality of push rods 65 extending toward a moving iron core 76 within the valve body 20. Thereby, the valve member 26 is driven by the moving iron core 76 via the push rods 65. Between the valve member 26 and the periphery of the supply valve seat 61, valve springs 67 are placed so that the valve member 26 is urged toward the discharge valve seat 62 by the urging force of the valve springs 67.

In the electromagnetic operation unit 28, within a magnetic substance cover 70 with a rectangular section, an annular bobbin 71 is arranged. Both ends of an exciting coil 72 wound around the bobbin 71 are respectively connected to a pair of coil terminals 73 (see FIGS. 4 and 10) extending toward the valve body 20. Within the bobbin 71, there are provided a fixed iron core 75 being in contact with the end face of the magnetic substance cover 70 and the slidable moving iron core 76 brought into or out of contact with the fixed iron core 75 by an electromagnetic force due to the turning on or off the exciting coil 72 of an electric current and the urging force of the valve springs 67. Between the bobbin 71 and the valve body 20, an annular magnetic substance blade 77 is interposed for forming a magnetic path between the inner face of the magnetic substance cover 70 and the moving iron core 76. Furthermore, between an annular cap 78 fixed to the periphery of the end of the moving iron core 76 and the magnetic substance blade 77, reset springs 79 are interposed.

Figure 11:
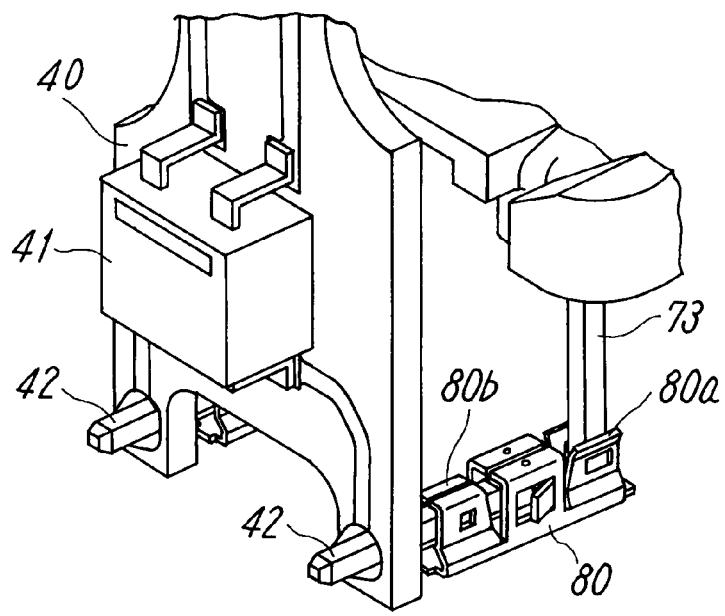
FIG. 11 is a partial perspective view of an essential part of FIG. 10.

As shown in FIGS. 10 and 11 in detail, the pair of coil terminals 73 respectively connected to both ends of the exciting coil 72, the coil terminal 73 having a bar shape with a square cross-section, protrude toward the valve body 20 through a flange of the bobbin 71. The coil terminal 73 is electrically connected to the electrification terminal 80 arranged within the terminal hole 74a of the protruding cylinder 74 by being elastically fitted into a clamping part 80a of the electrification terminal 80. When the protruding cylinders 74 are respectively fitted into the recesses 46a formed on the first fixing face 31a of the fixing plate 31, the connection terminal 42 of the printed circuit board 40 is configured to electrically connect to the electrification terminal 80 by being elastically fitted into a clamping part 80b of the electrification terminal 80.

In FIG. 12, reference numeral 90 denotes a gasket for sealing the periphery of the rectangular protruding cylinders 74 as well as the openings of the ports 21 to 23 by being fitted into the grooves of the peripheries of the ports 21 to 23; numeral 91 a gasket for sealing the periphery of the accommodation space 45 of the printed circuit board 40 as well as the peripheral edges of the flow paths 35 to 37 of the solenoid-valve holder 2; numeral 92 a filling hole for filling inside the magnetic substance cover 70 of the solenoid valve 3 with silicone for improving the heat dissipation effect; and numeral 93 a packing for sealing the periphery of the filling hole 92.

The invention claimed is:

1. A three-port solenoid valve assembly comprising:
a solenoid valve including
  a valve body having a valve chamber communicating with a plurality of ports,
  a valve member arranged in the valve chamber that switches communication between the plurality of ports, and
  an electromagnetic operation unit fixed to the valve body that drives the valve member;
a main directional control valve using the solenoid valve as a pilot valve; and
a solenoid-valve holder that is made of a nonconductive material and is configured to mount the solenoid valve on the main directional control valve, the solenoid valve and the solenoid-valve holder being distinct components, such that the solenoid valve is removably mounted to the solenoid-valve holder,
wherein the solenoid-valve holder includes
  a fixing plate having
    a first fixing face configured to mount the solenoid valve thereon, and
    a second fixing face configured to attach the main directional control valve thereon,
  a terminal block formed integrally with the fixing plate, the terminal block extending perpendicularly to the fixing plate, and
  an electrification system that provides electricity to an exciting coil of the solenoid valve,
wherein, when the solenoid valve is mounted on the fixing plate, a pair of connection terminals, disposed on the solenoid-valve holder, is electrically connected to a pair of electrification terminals that are disposed on the solenoid valve and connected to the exciting coil,
wherein the terminal block includes a pair of receiving terminals arranged to protrude outside the terminal block to connect the connection terminals to terminals of external power, and
wherein the fixing plate of the solenoid-valve holder is linked to the terminal block to form an L-shape, such that a mount side of the solenoid valve and a top face of the electromagnetic operation unit are completely covered by the fixing plate and the terminal block.

2. The assembly according to claim 1, wherein the second fixing face of the fixing plate of the solenoid-valve holder includes a concave accommodating space, and
wherein the three-port solenoid valve assembly further comprises a printed circuit board arranged within the accommodating space, the printed circuit board having a control circuit, to which the connection terminals and the receiving terminals are connected that controls electrification of the solenoid valve.

3. The assembly according to claim 1, wherein the solenoid valve further includes two protruding cylinders having the electrification terminals built therein, and
wherein the solenoid-valve holder further includes two recesses correspondingly shaped to receive the protruding cylinders, each recess having one of the connection terminals arranged therein, so that when the solenoid valve is attached on the solenoid-valve holder, the protruding cylinders are received into the recesses and the connection terminals are electrically connected to the electrification terminals.

4. The assembly according to claim 1, wherein the exciting coil of the solenoid valve is covered with a magnetic substance cover forming a magnetic path, and
wherein the solenoid-valve holder further includes
  a grounding terminal that grounds the three-port solenoid valve assembly, and
an earth plate disposed in contact with the grounding terminal, so that the earth plate is brought into contact with the magnetic substance cover when the solenoid valve is mounted on the solenoid-valve holder.

5. A three-port solenoid valve assembly comprising:
a solenoid valve including
  a valve body having
    a supply port,
    an output port,
    a discharge port, and
    a valve chamber communicating with the supply port, the output port, and the discharge port,
  a valve member arranged in the valve chamber that switches communication between the supply port, the output port, and the discharge port, and
  an electromagnetic operation unit fixed to the valve body that drives the valve member;
a main directional control valve using the solenoid valve as a pilot valve; and
a solenoid-valve holder that is made of a nonconductive material and is configured to mount the solenoid valve on the main directional control valve, the solenoid valve and the solenoid-valve holder being distinct components, such that the solenoid valve is removably mounted to the solenoid-valve holder,
wherein the solenoid-valve holder includes
  a fixing plate having
    a first fixing face configured to mount the solenoid valve thereon, and
    a second fixing face configured to attach the main directional control valve thereon,
  a terminal block formed integrally with the fixing plate, the terminal block extending perpendicularly to the fixing plate, and
  an electrification system that provides electricity to an exciting coil of the solenoid valve,
wherein, when the solenoid valve is mounted on the fixing plate, the fixing plate includes a supply flow path, an output flow path, and a discharge flow path that connect the supply port, the output port, and the discharge port to a supply opening of the main directional control valve, a pilot fluid inlet of the main directional control valve, and a discharge outlet of the main directional control valve, respectively, wherein, when the solenoid valve is mounted on the fixing plate, a pair of connection terminals, disposed on the solenoid-valve holder, is electrically connected to a pair of electrification terminals that are disposed on the solenoid valve and connected to the exciting coil, wherein the terminal block includes a pair of receiving terminals arranged to protrude outside the terminal block to connect the connection terminals to terminals of external power, and wherein the fixing plate of the solenoid-valve holder is linked to the terminal block to form an L-shape, such that a mount side of the solenoid valve and a top face of the electromagnetic operation unit are completely covered by the fixing plate and the terminal block.

6. The assembly according to claim 5, wherein the solenoid-valve holder further includes side covers that cover both sides of the solenoid valve, the sides opposing each other and being adjacent to the mount side of the solenoid valve.

7. The assembly according to claim 5, wherein the second fixing face of the fixing plate of the solenoid-valve holder includes a concave accommodating space, and wherein the three-port solenoid valve assembly further comprises a printed circuit board arranged within the accommodating space, the printed circuit board having a control circuit, to which the connection terminals and the receiving terminals are connected that controls electrification of the solenoid valve.

8. The assembly according to claim 6, wherein the solenoid valve further includes two protruding cylinders having the electrification terminals built therein, and wherein the solenoid-valve holder further includes two recesses correspondingly shaped to receive the protruding cylinders, each recess having one of the connection terminals arranged therein, so that when the solenoid valve is attached on the solenoid-valve holder, the protruding cylinders are received into the recesses and the connection terminals are electrically connected to the electrification terminals.

9. The assembly according to claim 6, wherein the exciting coil of the solenoid valve is covered with a magnetic substance cover forming a magnetic path, and wherein the solenoid-valve holder further includes
a grounding terminal that grounds the three-port solenoid valve assembly, and
an earth plate disposed in contact with the grounding terminal, so that the earth plate is brought into contact with the magnetic substance cover when the solenoid valve is mounted on the solenoid-valve holder.

10. The assembly according to claim 9, wherein the earth plate includes a contact piece protruding from the first fixing face of the fixing plate, the contact piece being in elastic contact with the magnetic substance cover of the solenoid valve.

11. The assembly according to claim 5, wherein the valve body of the solenoid valve and the fixing plate of the solenoid-valve holder include a plurality of fixing holes passing therethrough, such that the solenoid valve and the solenoid-valve holder are configured to be fixed to a pneumatic instrument with fixing screws inserted into the fixing holes.

12. The assembly according to claim 6, wherein the non-conductive material of the solenoid-valve holder comprises a synthetic resin.

* * * * *